United States Patent [19]

Mooney et al.

[11] 4,138,950
[45] Feb. 13, 1979

[54] ADJUSTABLE LOAD SECUREMENT SYSTEM FOR FLAT BED VEHICLES

[76] Inventors: Gerald R. Mooney, 3080 Eldogor La., New Castle, Pa. 16105; Louis A. Mooney, 1002 Ryan Ave., New Castle, Pa. 16101

[21] Appl. No.: 779,003

[22] Filed: Mar. 18, 1977

[51] Int. Cl.² ............... B60P 7/10; B60P 7/16; B61D 45/00; B61D 49/00
[52] U.S. Cl. ............................ 105/482; 105/476; 280/179 A
[58] Field of Search ............ 105/39 D, 475, 476, 105/477, 481, 482; 254/78; 280/179 A

[56] References Cited

U.S. PATENT DOCUMENTS

| 994,822 | 6/1911 | Daly | 280/179 A X |
|---|---|---|---|
| 3,473,487 | 10/1969 | Blunden | 280/179 A X |
| 3,633,937 | 1/1972 | Hlinsky | 280/179 A |
| 3,740,073 | 6/1973 | Schwiebert | 280/179 A |
| 3,988,005 | 10/1976 | Mooney et al. | 254/78 |
| 4,010,694 | 3/1977 | Mooney et al. | 105/482 |

Primary Examiner—Drayton E. Hoffman
Assistant Examiner—Howard Beltran
Attorney, Agent, or Firm—Colton & Stone, Inc.

[57] ABSTRACT

Load binder chain attachment points are provided by anchor point assemblies carried on the stepped side sill of a flat bed vehicle. The anchor point assemblies are selectably positionable along the length of the vehicle. The stepped side sill allows the use of conventional removable side panels without interference with the anchor points or binder chains.

4 Claims, 6 Drawing Figures

ADJUSTABLE LOAD SECUREMENT SYSTEM FOR FLAT BED VEHICLES

BACKGROUND OF THE INVENTION

The present invention relates to load securement systems for vehicles such as flat bed trailers and railway flat cars and, more particularly, to the provision of an improved positionally adjustable anchor system.

In the transportation of goods by flat bed vehicles, it is common practice to secure the load to the bed of the vehicle by the use of chains or straps passed over the load and connected to anchor points along opposite sides of the vehicle bed. Because load configurations vary widely, it is necessary to have many available anchor positions along the length of the vehicle. In order to minimize the loss of binder chains or straps, it is preferrable to have the chains or straps permanently connected to the anchor points and to the vehicle. In order to provide permanent attachment while permitting ready adjustment of the anchor positions, load securement systems have been developed in which the anchor points are mounted in ways extending the length of the vehicle bed and which may be locked in selected positions along the bed. Typical examples of these systems are disclosed in U.S. Pat. Nos. 3,633,937, Hlinsky; 3,740,073, Schwiebert; and 4,010,694, Mooney et al.

It is the primary object of the present invention to provide an improved positionally adjustable securement system which is located along the side edges of the vehicle bed thus leaving the bed free of either channels or projecting obstructions and which does not interfer with the use of conventional removable side panels.

BRIEF SUMMARY OF THE INVENTION

The above and other objects of the invention which will become apparent hereinafter are achieved by the provision of a load securement system for a flat bed vehicle which includes a modified side channel having a step or shelf-like portion extending along the lateral edge of the vehicle bed and offset downwardly from the floor thereof, a plurality of guide block members spaced above the shelf and at uniformly spaced intervals along the trailer and which have slotted lower faces together providing a continual channel, an anchor point and latch assembly slidable on the shelf of the side channel and having an upwardly projecting rib received in the slots of the guide members, means by which a chain or the like may be attached, and a pivotally mounted latch plate movable between a first position in which the plate is between adjacent guide members and a second position in which the plate is clear of the members. The side channel has a lower vertical portion which is provided with conventional stake pockets and rub rails.

For a more complete understanding of the invention and the objects and advantages thereof, reference should be had to the following detailed description and the accompanying drawings wherein there is disclosed a preferred embodiment of the invention.

DETAILED DESCRIPTION OF THE PREFERRED EMBODIMENT

Figure 1:
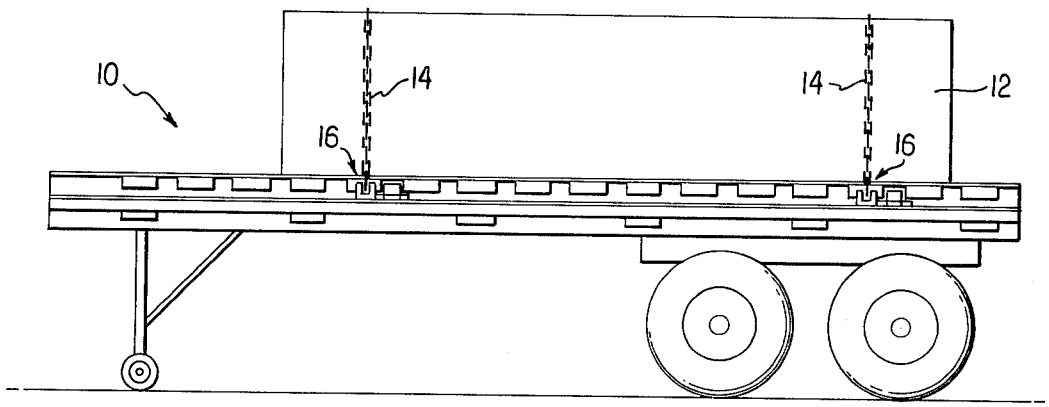
FIG. 1 is a side elevational view of a trailer equipped with the positionally adjustable load securement system of the present invention.

Referring first to FIG. 1, there is shown a flat bed trailer, designated generally by the reference numeral 10, on which is positioned a load, designated generally by the reference numeral 12, the load being secured to the trailer by means of binder chains 14 attached to the securement system 16 of the present invention. Preferrably, the binder chains are permanently connected to the securement system and include permanently attached load binders, for example, a load binder and chain assembly of the type disclosed in U.S. Pat. No. 3,988,005, Mooney et al.

Figure 2:
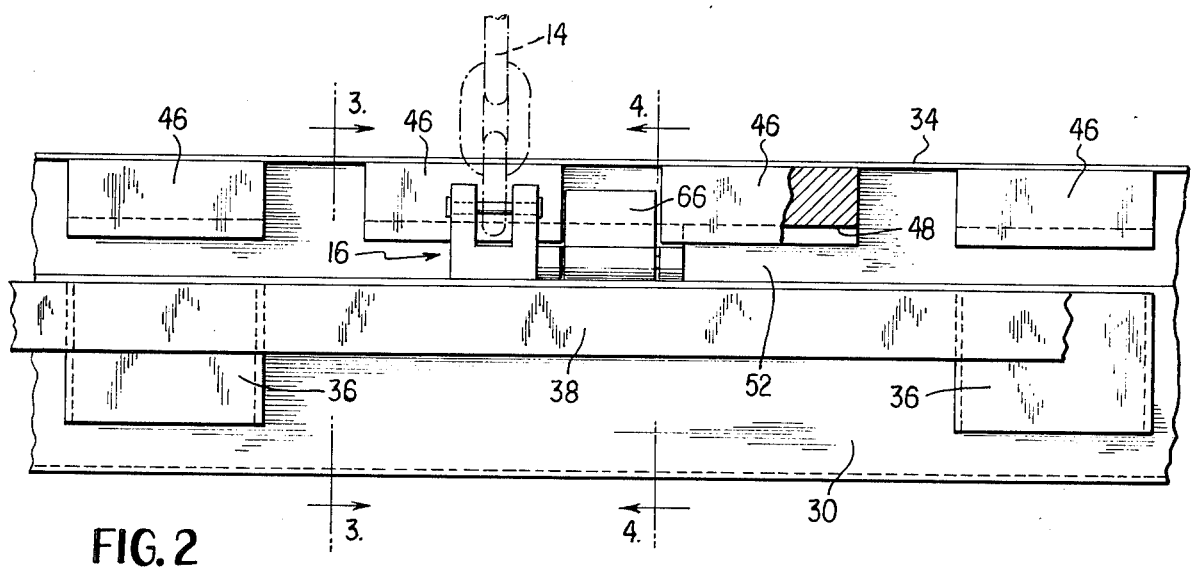
FIG. 2 is a fragmentary side elevational view, on an enlarged scale relative to that of FIG. 1, of the trailer flat bed and adjustable load securement system.
Figure 3:
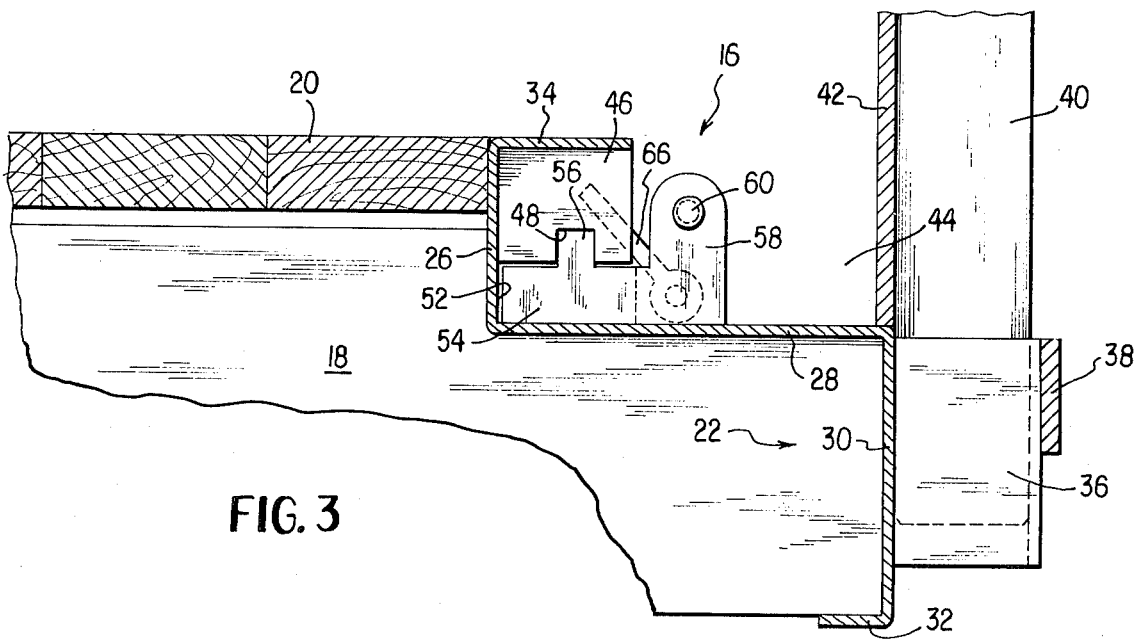
FIGS. 3 and 4 are fragmentary transverse sectional views taken along the lines 3—3 and 4—4, respectively, of FIG. 2.

As can be seen from FIGS. 2 and 3, the securement system 16 is located along the lateral edge of the trailer bed. It will be understood that while only one side of the trailer is shown as being equipped with the securement system, the identical arrangement may be provided on the opposite side as well. The trailer 10 has conventional cross sills 18 supporting a wooden floor 20 and side channels 22 which are of generally of S-shaped cross-sectional configuration. As indicated by the reference numeral 24, the upper ends of the cross sills may be notched to recieve the side channels. Each side channel 22 has an upper vertical section 26 abutting the edge of the floor 20, a horizontal section 28 and a lower vertical section 30 covering the ends of the cross sills. The lower edge 32 of the side channel returns inwardly while the upper edge 34 is flush with the floor 20. Stake pockets 36 are provided at uniform intervals along the length of the trailer and support a rub rail 38. The stake pockets receive stakes 40 which may be provided with side panels 42. The configuration of the side channel 22 provides a shelf or step 44 extending the length of the vehicle bed and serving as a support surface for both the anchor point assemblies 16 which will be described hereinafter and the side panels 42.

A plurality of guide members 46 are secured to the upper vertical portion of the side channel 26. The blocks 46 have continuous slots 48 extending along their lower surfaces and are mounted at uniformly spaced intervals along the length of the trailer bed, leaving openings 50 between each pair of blocks. The slots 48 provide ways in which the anchor point assemblies are guided while the openings 50 serve to receive the locking members of the assemblies.

Figure 5:
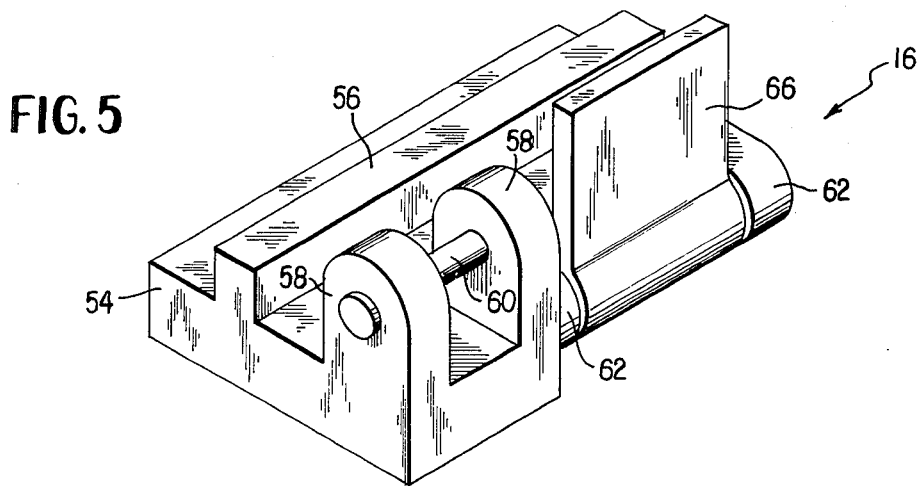
FIG. 5 is a perspective view of the anchor point and latch assembly forming a part of the securement system.
Figure 6:
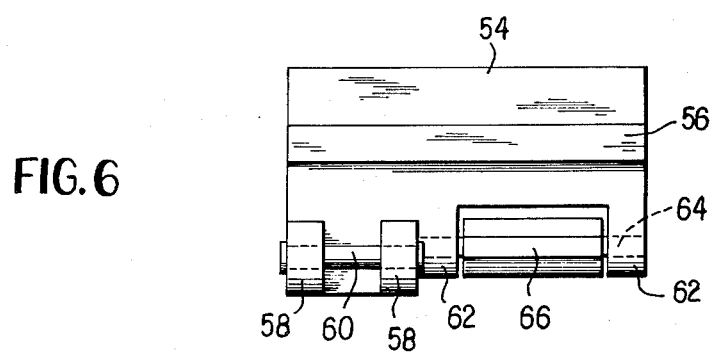
FIG. 6 is a plan view of the assembly of FIG. 5.

The anchor point assembly 16 is illustrated in detail in FIGS. 5 and 6. The assembly has a rectangular base plate 54 which is of a height slightly less than the distance 52 between the horizontal portion 28 of the side channel 22 and the bottom surface of the blocks 46. A rib 56, which is of complementary configuration to the slot 48, projects upwardly from the base 54. The front side of the base 54 is provided with an upwardly projecting pair of lugs 58 carrying, at their upper ends, a pin 60 to which the binder chain is attached. A second pair of lugs 62 serve as journal points for studs 64 which project from a latch plate 66.

Figure 4:
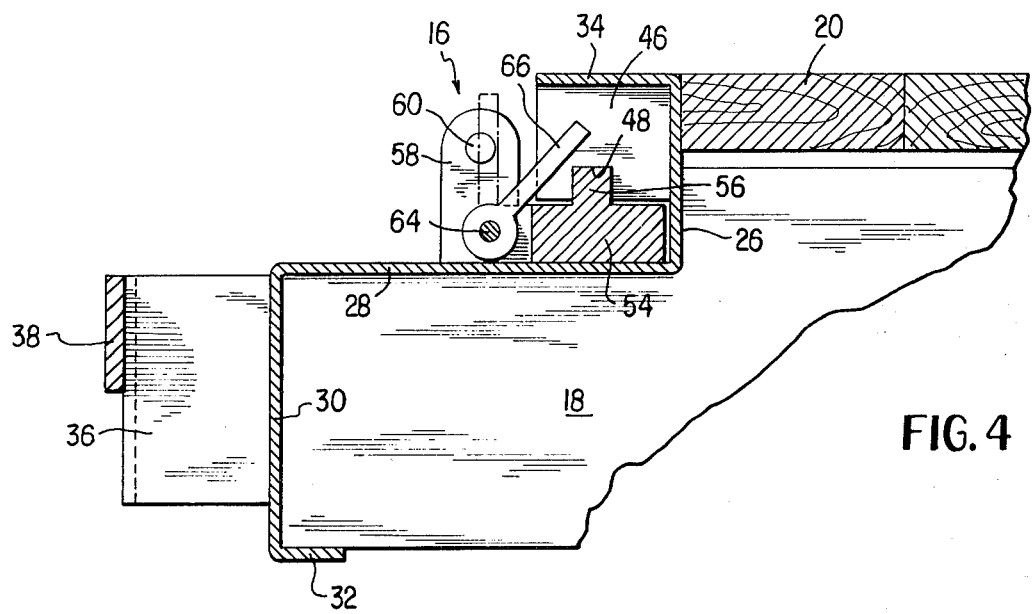

The operation of the securement assembly of the present invention will be readily apparent from a consideration of FIGS. 2 and 4. When the lock plate 66 is in a vertical position, as indicated in phantom outline in FIG. 4, the assembly 16 may be slid along the length of the trailer, the rib 48 of the anchor assembly 16 being guided in the ways defined by the slots 48 of the block-like members 46. Upon reaching the desired location for the anchor point, the lock plate is permitted to drop into the space 50 between adjacent ones of the members 46, thereby locking the assembly at the desired position.

It will be understood that while a single embodiment of the invention has been illustrated and described in detail, the invention is not limited thereto or thereby. Rather, reference should be had to the appended claims in determining the true scope of the invention.

What is claimed is:

1. A positionably adjustable load securement system for use in conjunction with a flat bed vehicle, comprising:
   a first structural member secured to and extending laterally from the lateral edge of said vehicle and being offset downwardly from the bed of said vehicle;
   a plurality of guide members vertically positioned and secured at uniformly spaced intervals along the lateral edge of said vehicle and above said first structural member, each of said guide members having a slotted lower face and together forming a continual channel; and
   an anchor assembly having a base slidable on said first structural member beneath said guide members, an upwardly projecting rib complementary to said guide member slots and of a length greater than the separation between adjacent ones of said guide members, and a pivotally mounted latch plate movable between a first position in which said plate projects between adjacent guide members and a second position in which said plate is clear of said guide members.

2. The positionally adjustable load securement system of claim 1 further including a second structural member secured to and extending downwardly from the outer end of said first structural member and a plurality of stake pockets secured at uniformly spaced intervals to the lateral face of said second structural member, the arrangement being such as to allow clearance for said anchor assemblies when stake pocket mounted side panels are in position.

3. The positionally adjustable load securement system of claim 2 wherein said first and second structural members are sections of the side sill of said vehicle.

4. The positionally adjustable load securement system of claim 3 wherein said side sill includes an upper section overlying the upper faces of said guide members and flush with the bed of said vehicle.

* * * * *